(12) United States Patent
Kim et al.

(10) Patent No.: US 12,151,375 B2
(45) Date of Patent: Nov. 26, 2024

(54) GRIP APPARATUS AND ROBOT APPARATUS INCLUDING THE SAME

(71) Applicant: SAMSUNG ELECTRONICS CO., LTD., Suwon-si (KR)

(72) Inventors: Jinho Kim, Suwon-si (KR); Heeseung Choi, Suwon-si (KR); Cheoggyu Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 422 days.

(21) Appl. No.: 17/545,532

(22) Filed: Dec. 8, 2021

(65) Prior Publication Data

US 2022/0126443 A1 Apr. 28, 2022

Related U.S. Application Data

(63) Continuation of application No. PCT/KR2021/014687, filed on Oct. 20, 2021.

(30) Foreign Application Priority Data

Oct. 22, 2020 (KR) .......................... 10-2020-0137810
Sep. 9, 2021 (KR) .......................... 10-2021-0120643

(51) Int. Cl.
*B25J 9/16* (2006.01)
*B25J 9/10* (2006.01)
(Continued)

(52) U.S. Cl.
CPC ............. *B25J 9/1612* (2013.01); *B25J 9/102* (2013.01); *B25J 9/1065* (2013.01); *B25J 9/1697* (2013.01);
(Continued)

(58) Field of Classification Search
CPC ........ B25J 9/102; B25J 9/1065; B25J 9/1612; B25J 9/1697; B25J 13/08; B25J 15/0028; B25J 15/086
See application file for complete search history.

(56) References Cited

U.S. PATENT DOCUMENTS 8,380,351 B2    2/2013   Okuda et al.
8,585,111 B2 * 11/2013   Nammoto ................ B25J 15/10
                                                                                                                            901/38

(Continued)

FOREIGN PATENT DOCUMENTS

CN    106078781 A   * 11/2016   .......... B25J 15/0266
CN    111283707 A     6/2020
(Continued)

OTHER PUBLICATIONS

International Search Report dated Jan. 5, 2022 issued by the International Searching Authority in counterpart International Application No. PCT/KR2021/014687 (PCT/ISA/210).

(Continued)

*Primary Examiner* — Saul Rodriguez
*Assistant Examiner* — Brendan P Tighe
(74) *Attorney, Agent, or Firm* — Sughrue Mion, PLLC

(57) ABSTRACT

A grip apparatus is provided. The grip apparatus includes a first finger; a second finger configured to face the first finger, a first link configured to have a first end connected to the first finger, a second link configured to have a first end connected to the second finger, and a differential apparatus including a motor and configured to connect a second end of the first link and a second end of the second link. The differential apparatus rotates the first link and the second link in different directions when the motor is driven. The differential apparatus rotates the first link in a first direction when the second link rotates in the first direction by an external force.

15 Claims, 12 Drawing Sheets

(51) Int. Cl.
    *B25J 13/08*     (2006.01)
    *B25J 15/00*     (2006.01)
    *B25J 15/08*     (2006.01)

(52) U.S. Cl.
    CPC ........... *B25J 13/08* (2013.01); *B25J 15/0028* (2013.01); *B25J 15/086* (2013.01)

(56) References Cited

U.S. PATENT DOCUMENTS

| | | | |
|---|---|---|---|
| 9,314,934 | B2 | 4/2016 | Whitney |
| 9,643,323 | B2* | 5/2017 | Nagatsuka ............ B25J 15/0009 |
| 9,782,902 | B1 | 10/2017 | Kim et al. |
| 10,046,461 | B2 | 8/2018 | Ekas |
| 10,434,665 | B2 | 10/2019 | Nakayama |
| 2011/0241369 | A1* | 10/2011 | Kamon ................. B25J 15/026 |
| | | | 294/213 |
| 2014/0265401 | A1 | 9/2014 | Allen Demers et al. |
| 2022/0219336 | A1* | 7/2022 | Hiraguri ................. B25J 17/02 |
| 2022/0219915 | A1* | 7/2022 | Shiba ..................... B25J 13/088 |

FOREIGN PATENT DOCUMENTS

| | | | |
|---|---|---|---|
| JP | 60-25686 A | | 2/1985 |
| JP | 2001029411 A | | 2/2001 |
| JP | 2005230999 A | * | 9/2005 |
| JP | 2008-49456 A | | 3/2008 |
| JP | 2008049456 A | * | 3/2008 |
| JP | 4591043 B2 | | 12/2010 |
| JP | 5086778 B2 | | 11/2012 |
| KR | 10-1999-0052635 A | | 7/1999 |
| KR | 1020110094083 A | | 8/2011 |
| KR | 10-1444386 B1 | | 9/2014 |
| KR | 10-2018-0002950 A | | 1/2018 |
| WO | 2018/100500 A1 | | 6/2018 |
| WO | 2019/039646 A1 | | 2/2019 |
| WO | WO-2022003727 A1 * | 1/2022 | ............ B25J 15/026 |

OTHER PUBLICATIONS

International Written Opinion dated Jan. 5, 2022 issued by the International Searching Authority in counterpart International Application No. PCT/KR2021/014687 (PCT/ISA/237).
Communication issued on Feb. 13, 2024 by the European Patent Office for European Patent Application No. 21883230.1.

* cited by examiner

GRIP APPARATUS AND ROBOT APPARATUS INCLUDING THE SAME

CROSS-REFERENCE TO RELATED APPLICATION(S)

This application is a bypass continuation of International Application No. PCT/KR2021/014687, filed on Oct. 20, 2021, which is based on and claims priority to Korean Patent Application No. 10-2021-0120643, filed on Sep. 9, 2021, in the Korean Intellectual Property Office, and Korean Patent Application No. 10-2020-0137810, filed on Oct. 22, 2020, in the Korean Intellectual Property Office, the disclosures of which are incorporated by reference herein in their entireties.

BACKGROUND

1. Field

The disclosure relates to a grip apparatus, and more particularly, to a grip apparatus having an improved structure to stably grip an object even when an external force is applied, and a robot apparatus including the same.

2. Description of the Related Art

With the development of electronic technology, various electronic devices have been developed. In particular, in recent years, various robot apparatuses for performing tasks on behalf of humans in industrial fields, medical care, space, housekeeping, and the like, have been developed. Such a robot apparatus may include a grip apparatus capable of performing various tasks such as gripping, assembling, transporting, welding, and the like, of an object.

On the other hand, when an external force is applied to the grip apparatus, there is a risk that the grip apparatus may drop a gripped object, and the dropped object may be damaged, a motor may fail, the rigid grip apparatus or an obstacle colliding with the grip apparatus may be damaged, or the grip apparatus may collide with a user and cause injury. Accordingly, an active adaptation apparatus that detects an external force in advance through a sensor or controls movement of the grip apparatus after the external force is applied has been developed. However, when a sensing value of the sensor is inaccurate or an unavoidable situation occurs even if an external force is detected in advance, there is a problem in that there is a very high risk of damage to the object collided with the grip apparatus or injury to a person.

Accordingly, there is an increasing need for a grip apparatus having a passive adaptation mechanism capable of effectively absorbing an impact by flexibly responding to an external force without a separate sensing process or control process.

SUMMARY

Provided are a grip apparatus having an improved structure to stably grip an object even when an external force is applied, and a robot apparatus including the same.

Additional aspects will be set forth in part in the description which follows and, in part, will be apparent from the description, or may be learned by practice of the presented embodiments.

According to an aspect of the disclosure, a grip apparatus may include a first finger; a second finger configured to face the first finger, a first link configured to have a first end connected to the first finger, a second link configured to have a first end connected to the second finger, and a differential apparatus including a motor and configured to connect a second end of the first link and a second end of the second link. The differential apparatus may rotate the first link and the second link in different directions when the motor is driven. The differential apparatus may rotate the first link in a first direction when the second link rotates in the first direction by an external force.

The first link may include a first gear region at the second end thereof, the second link may include a second gear region at the second end thereof, and the differential apparatus may include a first gear configured to be engaged with the first gear region, a second gear configured to be interlocked with the first gear and rotate with respect to the first gear, and a third gear configured to be engaged with the second gear region and the second gear.

The differential apparatus may include a ring gear configured to be disposed between the first gear and the second gear, and configured to be rotated by the motor.

The first gear region and the second gear region may have the same gear ratio.

The differential apparatus may include a first shaft configured to have a first end connected to the first gear and rotate integrally with the first gear and a second shaft configured to have a first end connected to the second gear and rotate integrally with the second gear. The first shaft and the second shaft may be coaxially disposed.

The differential apparatus may include a ring gear configured to be disposed between the first gear and the second gear and configured to be rotated by the motor, a side gear configured to be connected to a second end of the first shaft and configured to be rotated integrally with the first shaft, a first spider shaft and a second spider shaft configured to be disposed in parallel with the first shaft and configured to be rotated integrally with the ring gear, a first spider gear engaged with the side gear and configured to be rotatably supported on the first spider shaft, and a second spider gear engaged with the first spider gear and the second gear and configured to be rotatably supported on the second spider shaft.

The first gear region and the third gear may be disposed on opposite sides with respect to a central axis of the first shaft and the second shaft.

The differential apparatus may include a ring gear configured to be disposed between the first gear and the second gear and configured to be rotated by the motor. The first shaft may penetrate the ring gear.

The differential apparatus may include a first cam member configured to be connected in parallel to the first shaft, and a second cam member configured to be connected in parallel to the second shaft and in contact with the first cam member.

The differential apparatus may include a bolt configured to be fixedly disposed inside at least one of the first shaft and the second shaft, and a pressing member configured to connect at least one of the first cam member and the second cam member with the bolt.

The pressing member may include a compression spring.

The first shaft and the second shaft may include key grooves formed on inner surfaces thereof. The first cam member and the second cam member may be respectively inserted along the key grooves formed in the first and second shafts.

The first cam member and the second cam member may include concave surfaces facing each other.

The grip apparatus may further include a housing configured to rotatably support one end of each of the first link and the second link.

In accordance with an aspect of the disclosure, a robot apparatus may include an image sensor configured to detect of a shape of an object, a grip apparatus including a first finger, a second finger, a first link configured to have a first end connected to the first finger, a second link configured to have a first end connected to the second finger, and a differential apparatus including a motor and configured to connect a second end of the first link and a second end of the second link, and a processor configured to control the grip apparatus such that the first finger and the second finger are spaced apart by a distance corresponding to a thickness of the object detected by the image sensor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

It should be understood that the embodiments described below are illustratively shown to help understanding of the disclosure, and that the disclosure may be implemented in various modifications, unlike the embodiments described herein. However, in the following description of the disclosure, when it is determined that a detailed description of related known functions or components may unnecessarily obscure the subject matter of the disclosure, the detailed description and specific illustration will be omitted. Further, the accompanying drawings are not illustrated to scale, but sizes of some of components may be exaggerated to help the understanding of the disclosure.

The terms used in the specification and claims have chosen generic terms in consideration of the functions of the disclosure. However, these terms may vary depending on the intentions of the artisan skilled in the art, legal or technical interpretation, and emergence of new technologies. In addition, some terms are arbitrarily chosen by the applicant. These terms may be interpreted as meanings defined in the specification, and may also be interpreted based on the general contents of the specification and common technical knowledge in the art without specific term definitions.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In addition, in the specification, components necessary for description of each embodiment of the disclosure are described, and thus are not necessarily limited thereto. Therefore, some components may be changed or omitted, and other components may be added. In addition, the components may be disposed to be distributed in different independent apparatuses.

Further, hereinafter, embodiments of the disclosure will be described in detail with reference to the accompanying drawings and the contents described in the accompanying drawings, but the disclosure is not limited or restricted to the embodiments.

Hereinafter, the disclosure will be described in more detail with reference to the accompanying drawings.

Figure 1:
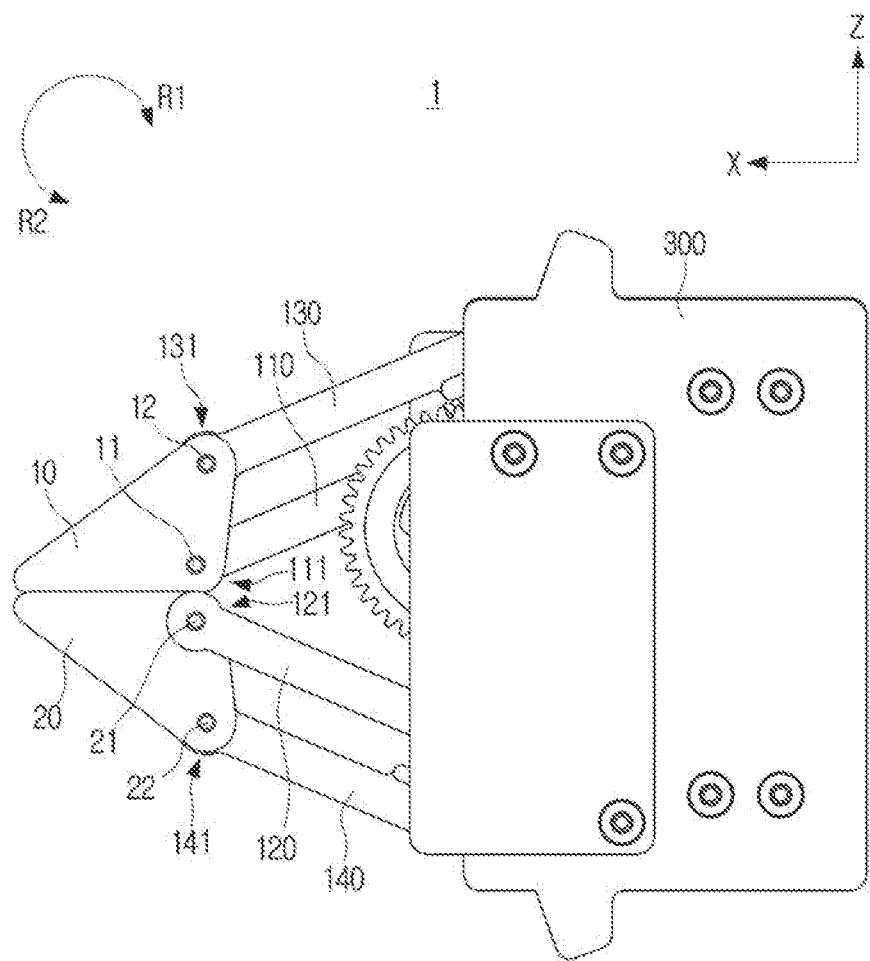
FIG. 1 is a side view of a grip apparatus according to an embodiment.
Figure 2:
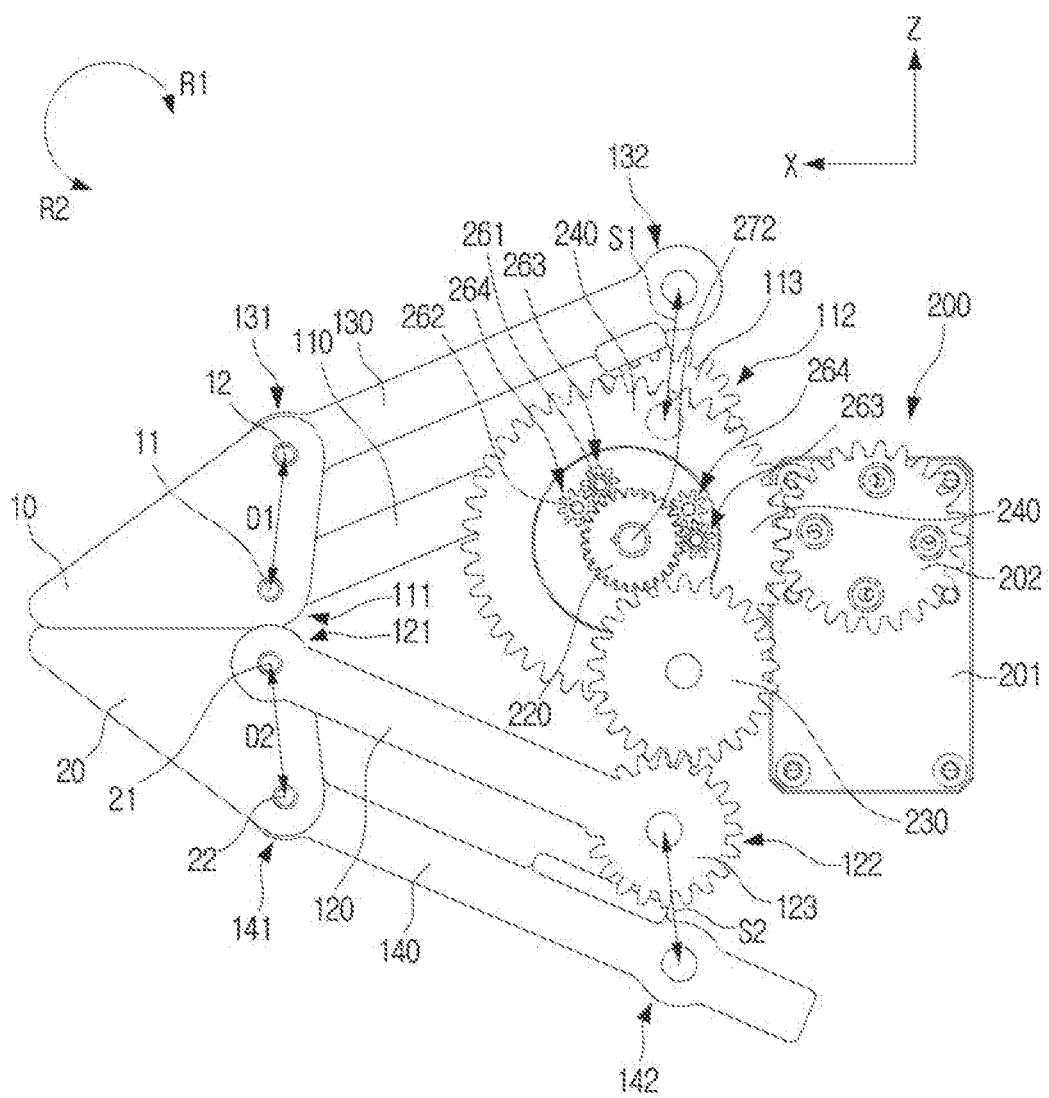
FIG. 2 is a side view of the grip apparatus with a housing being removed according to an embodiment.
Figure 3:
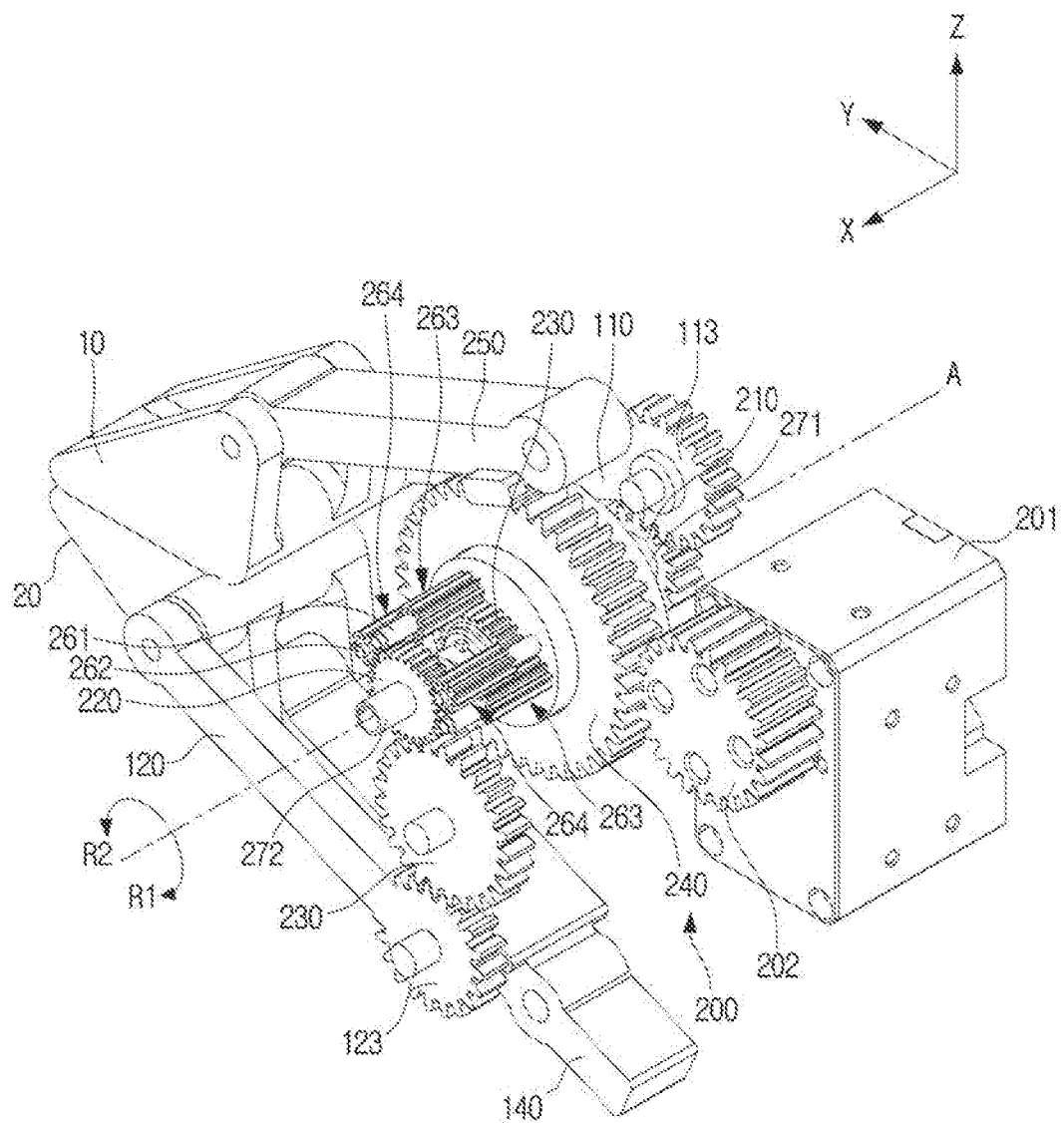
FIG. 3 is a perspective view of the grip apparatus of FIG. 2 according to an embodiment.

FIG. 1 is a side view of a grip apparatus according to an embodiment. FIG. 2 is a side view of the grip apparatus with a housing being removed according to an embodiment. FIG. 3 is a perspective view of the grip apparatus of FIG. 2 according to an embodiment.

Referring to FIGS. 1 to 3, a grip apparatus 1 according to an embodiment of the disclosure may include a first finger 10, a second finger 20, a first link 110, a second link 120, a differential apparatus 200, a third gear 230, and a housing 300.

The first finger 10 and the second finger 20 may be disposed to face each other and may be spaced apart by a predetermined distance to form a space between which an object to be gripped is disposed. The surfaces of the first and second fingers 10 and 20 facing each other may be parallel.

A spacing between the first and second fingers 10 and 20 may be adjusted as the differential apparatus 200 (described below) drives the first and second links 110 and 120.

The first link 110 may support the first finger 10. The first end 111 of the first link 110 may be connected to the first finger 10, and the second end 112 thereof may be rotatably connected to the housing 300.

The second link 120 may support the second finger 20. The first end 121 of the second link 120 may be connected to the second finger 20, and the second end 122 thereof may be rotatably connected to the housing 300.

The first and second links 110 and 120 may have a straight shape and may have the same length.

The first link 110 may include a first gear region 113 at the second end 112 thereof, and the second link 120 may also include a gear region 123 at the second end 122 thereof. The gear regions 113 and 123 of the first and second links 110 and 120 may be disposed to be engaged with gears of the differential apparatus 200 to be described later. Accordingly, when the gear regions 113 and 123 of the first and second links 110 and 120 are rotated by the differential apparatus 200, the first and second links 110 and 120 may rotate about the second ends 112 and 122, respectively, so that the spacing between the first and second fingers 10 and 20 may be adjusted.

Meanwhile, the housing 300 may rotatably support the second ends 112 and 122 of the first and second links 110 and 120.

The first end 111 of the first link 110 may be connected to a first point 11 of the first finger 10, and the first end 121 of the second link 120 may be connected to a first point 21 of the second finger 20.

In addition, the grip apparatus 1 may further include a third link 130 and a fourth link 140.

The third link 130 may be connected to a second point 12 of the first finger 10, and may be disposed in parallel with the first link 110. A distance S1 between the second end 112 of the first link 110 and the second end 132 of the third link 130 may have the same length as a distance D1 between the first point 11 and the second point 12 of the first finger 10.

The fourth link 140 may be connected to a second point 22 of the second finger 20, and may be disposed in parallel with the second link 120. A distance S2 between the second end 122 of the second link 120 and the second end 142 of the fourth link 140 may have the same length as a distance D2 between the first point 21 and the second point 22 of the second finger 20.

Because the first and second links 110 and 120 and one region of the first finger 10 have an approximately parallelogram shape as the first and second links 110 and 120, the first finger 10 may maintain a horizontal shape even when the first and second links 110 and 120 rotate.

Similarly, because the third and fourth links 130 and 140 and one region of the second finger 20 have an approximately parallelogram shape as the third and fourth links 130 and 140, the second finger 20 may maintain a horizontal shape even when the third and fourth links 130 and 140 rotate.

That is, the first and third links 110 and 130 and the second and fourth links 120 and 140 may each have a structure of a four-bar linkage. The first link 110, the third link 130, the first finger 10, and the housing 300 may have a closed-loop shape in which a total of four contacts are connected. Similarly, the second link 120, the fourth link 140, the second finger 20, and the housing 300 may also have a closed-loop shape in which a total of four contacts are connected.

Accordingly, because the four-bar linkage having the parallelogram shape supports the first and second fingers 10 and 20, respectively, the first and second fingers 10 and 20 may stably grip an object while maintaining a horizontal state.

The differential apparatus 200 may connect the second end 112 of the first link 110 and the second end 122 of the second link 120, and may include a motor 201.

The differential apparatus 200 may rotate the first and second links 110 and 120 in different directions when the motor 201 is driven. Accordingly, because the first finger 10 and the second finger 20 move away from or close to each other, the grip apparatus 1 may perform a gripping operation.

In addition, when one of the first and second links 110 and 120 rotates in a first direction by an external force, the differential apparatus 200 may also rotate the other of the first and second links 110 and 120 in the first direction. Here, the first direction may be an R1 direction or an R2 direction.

Accordingly, even if the external force is unintentionally applied to at least one of the first finger 10, the second finger 20, the first link 110, and the second link 120, the grip apparatus 1 may not drop the object being gripped and may maintain a gripping force because the first link 110 and the second link 120 rotate in the same direction.

The differential apparatus 200 may include a first gear 210, a second gear 220, and a third gear 230.

The first gear 210 may be engaged with the first gear region 113. The second gear 220 may be interlocked with the first gear 210 to rotate in the same direction as the first gear 210 or rotate in a direction different from that of the first gear 210. The third gear 230 may be engaged with the second gear region 123 and the second gear 220.

The first gear 210 and the first gear region 113 may have the same width and may be disposed on the same plane (e.g., Y-Z plane).

The third gear 230, the second gear region 123, and the second gear 220 may have the same width and may be disposed on the same plane (e.g., Y-Z plane).

That is, the first link 110 may rotate in an opposite direction to a rotation direction of the first gear 210, and the second link 120 may rotate in the same direction as a rotation direction of the second gear 220 by the third gear 230.

The first and second gears 210 and 220 of the differential apparatus 200 may rotate in the same direction or may rotate in different directions.

When a ring gear 240 of the differential apparatus 200 rotates by driving the motor 201, the first and second gears 210 and 220 may rotate in the same direction. Accordingly, when any one of the first gear 210 or the second gear 220 rotates in one direction by applying an external force to at least one of the first finger 10, the second finger 20, the first link 110, and the second link 120, the other of the first and second gears 210 and 220 may rotate in an opposite direction.

The differential apparatus 200 may include a ring gear 240 disposed between the first and second gears 210 and 220 and rotated by the motor 201. The differential apparatus 200 may further include a pinion 202 that is rotated by the motor 201 and is engaged with the ring gear 240, and when the pinion 202 is rotated by the motor 201, the ring gear 240 may rotate in an opposite direction to the pinion 202.

In addition, the differential apparatus 200 may include a first shaft 271 having a first end supporting the first gear 210 and rotating integrally with the first gear 210, and a second shaft 272 supporting the second gear 220 and rotating integrally with the second gear 220.

The first and second shafts 271 and 272 may be coaxially disposed, and accordingly, the first and second gears 210 and 220 may coaxially rotate. In addition, the first and second shafts 271 and 272 may be spaced apart from each other and rotate independently from each other.

The gear region 113 of the first link 110 and the third gear 230 may be disposed on opposite sides with respect to the central axis A of the first and second shafts 271 and 272. The gear region 113 of the first link 110 may be disposed on a +Z direction side from the central axis A of the first and second shafts 271 and 272, and the third gear 230 may be disposed on a −Z direction side from the central axis A of the first and second shafts 271 and 272.

The first shaft 271 may penetrate through the ring gear 240, and may rotate independently without being in contact with the ring gear 240.

The differential apparatus 200 may further include a side gear 250, a first spider shaft 261, a second spider shaft 262, a first spider gear 263, and a second spider gear 264.

The side gear 250 may be supported by the first shaft 271 and may rotate integrally with the first shaft 271. That is, the first shaft 271 may support the first gear 210 and the side gear 250 disposed at the first end and the second end thereof, and may rotate integrally with the first gear 210 and the side gear 250.

The first and second spider shafts 261 and 262 may be disposed in parallel with the first shaft 271 and may rotate integrally with the ring gear 240. The first spider shaft 261 and the second spider shaft 262 may be alternately disposed along a circumferential direction of the ring gear 240.

The first spider gear 263 may be rotatably supported on the first spider shaft 261, and may be disposed to be engaged with the side gear 250.

The second spider gear 264 may be rotatably supported on the second spider shaft 262, and may be disposed to be engaged with the first spider gear 263 and the second gear 220.

For example, when the ring gear 240 rotates in one direction, the first and second spider shafts 261 and 262 formed integrally with the ring gear 240 may also rotate in the same direction as the ring gear 240, and the first and second spider gears 263 and 264 may rotate in the same direction as the ring gear 240 about the central axis A of the first and second shafts 271 and 272 in a state that neither rotates.

Accordingly, the side gear 250 engaged with the first spider gear 263 may also rotate in the same direction as the ring gear 240, and the first shaft 271 and the first gear 210 formed integrally with the side gear 250 may also rotate in the same direction as the ring gear 240. Similarly, the second gear 220 engaged with the second spider gear 264 may also rotate in the same direction as the ring gear 240.

That is, when the motor 201 is driven to rotate the ring gear 240, both the first and second gears 210 and 220 may rotate in the same direction as the ring gear 240.

Meanwhile, when the first gear 210 rotates first, the first shaft 271 and the side gear 220 formed integrally with the first gear 210 may rotate in the same direction as the first gear 210. Thereafter, the first spider gear 263 engaged with the side gear 220 may rotate in the opposite direction to the first gear 210 with respect to the first spider shaft 261, and the second spider gear 264 engaged with the first spider gear 263 may rotate in the same direction as the first gear 210 with respect to the second spider shaft 262.

Finally, the second gear 220 engaged with the second spider gear 264 may rotate in an opposite direction to the first gear 210. That is, when the first gear 210 rotates first, the second gear 220 may rotate in the opposite direction to the first gear 220. Conversely, in a case in which the above-described power transmission process is reversed, when the second gear 220 rotates first, the first gear 210 may rotate in an opposite direction to the second gear 210.

That is, the differential apparatus 200 may rotate the first and second gears 210 and 220 in the same direction when the ring gear 240 is rotated by the motor 201. In addition, the differential apparatus 200 may rotate the first and second gears 210 and 220 in different directions when an external force is applied to at least one of the first finger 10, the second finger 20, the first link 110, and the second link 120.

Although it has been described that the structure of the differential apparatus 200 described above is implemented as a type of a plurality of spur gears, but is not limited thereto, and may be implemented as a type of a bevel gear.

Figure 4:
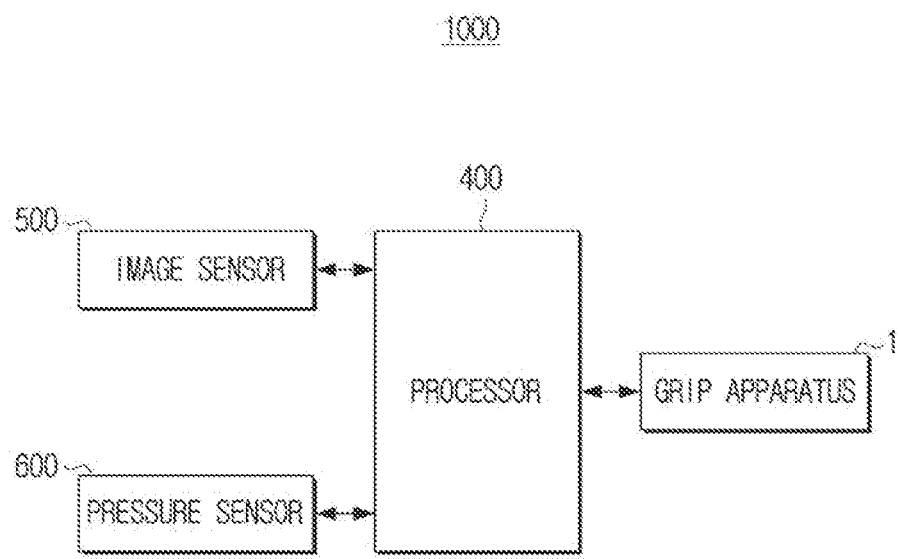
FIG. 4 is a block diagram of a robot apparatus according to an embodiment.

FIG. 4 is a block diagram of a robot apparatus according to an embodiment.

Referring to FIG. 4, a robot apparatus 1000 according to an embodiment of the disclosure may include a grip apparatus 1, a processor 400, an image sensor 500, and a pressure sensor 600.

The grip apparatus 1 may include a first finger 10, a second finger 20, a first link 110 and a second link 120 for supporting the first and second fingers 10 and 20, respectively, a differential apparatus 200 including a first gear 210 engaged with a gear region 113 of the first link 110 and a second gear 220 rotating by being interlocked with the first gear 210, and a third gear 230 engaged with a gear region 123 of the second link 120 and the second gear 220.

Because the detailed structure of the grip apparatus 1 has been described above, hereinafter, the parts overlapping with the above-described example regarding the configuration of the grip apparatus 1 may be simplified or omitted.

The processor 400 may control an overall operation of the robot apparatus 1000. To this end, the processor 400 may include a central processing unit (CPU) or an application processor (AP). Alternatively, the processor 400 may be implemented as at least one general processor, a digital signal processor, an application specific integrated circuit (ASIC), a system on chip (SoC), a microcomputer (MI-COM), a driver integrated circuit (IC), or the like.

The image sensor 500 may detect at least one of a shape and a position of an object. The image sensor 500 may be a camera configured to photograph an object around the robot apparatus 1000. For example, the image sensor 500 may be implemented as a three dimensional (3D) camera or a depth camera.

Such an image sensor 500 may be disposed on a body part or a head part of the robot apparatus 1000, but the position is not necessarily limited thereto, and the image sensor 500 may be disposed at various positions such as the first and second links 110 and 120 and the first and second fingers 10 and 20 of the grip apparatus 1.

The processor 400 may receive information on the shape and position of the object detected by the image sensor 500 and analyze the information to determine the position, size, shape, type, and the like of the object. The processor 400 may determine the size, shape, type, and the like, of the object by recognizing the object through an object recognition algorithm, and determine the position of the object based on depth information of the object.

The image sensor 500 may detect a position and shape of an object to be gripped, and transmit information on the detected position and shape to the processor 400. The processor 400 compares the information received from the image sensor 500 with shape information of various objects stored in the memory to determine the type and position of the object.

Accordingly, the processor 400 may control the grip apparatus 1 to move to a position adjacent to the object to be gripped. Thereafter, the processor 400 may control the grip apparatus so that the first and second fingers 10 and 20 have a spacing corresponding to a thickness of the object detected by the image sensor. In this case, the spacing between the first and second fingers 10 and 20 may be substantially equal to the thickness of the object to be gripped, and the first and second fingers 10 and 20 may easily grip the object.

Meanwhile, the robot apparatus 1000 may further include a pressure sensor 600 that measures a pressure applied to at least one of the first and second fingers 10 and 20. In addition, the processor 400 may control the operation of the grip apparatus 1 based on a value measured by the pressure sensor 600.

The pressure sensor 600 may measure a pressure applied to at least one of the first and second fingers 10 and 20. For example, the pressure sensor 600 may include a piezoelectric element or a load cell to convert the pressure applied to at least one of the first and second fingers 10 and 20 into an electrical signal and transmit the electrical signal to the processor 400.

The pressure sensor 600 may be disposed on opposite surfaces of the first and second fingers 10 and 20. Two pressure sensors 600 may be disposed on both the first and second fingers 10 and 20, or one pressure sensor 600 may be disposed on one of the first and second fingers 10 and 20.

When the grip apparatus 1 grips the object, the pressure sensor 600 may detect a pressure applied by the object to the first and second fingers 10 and 20, convert the pressure into an electrical signal, and transmit the electrical signal to the processor 400.

When the object to be gripped is positioned between the first and second fingers 10 and 20, the grip apparatus 1 may perform a gripping operation by the differential apparatus 200 of the grip apparatus 1. In this process, the object may apply a pressure to the first and second fingers 10 and 20, and the pressure sensor 600 may detect a value of the pressure.

The processor 400 may control the gripping operation of the grip apparatus 1 based on the value measured by the pressure sensor 600. When a measured pressure value reaches a critical pressure value by comparing the pressure value measured by the pressure sensor 600 with the critical pressure value stored in the memory, the processor 400 may control to stop driving of the differential apparatus 200 of the grip apparatus 1.

Accordingly, the robot apparatus 1000 according to an embodiment of the disclosure may prevent the problem that the object is damaged by excessive pressure or slips from the grip apparatus 1 by excessively small pressure, and may stably grip the object with an appropriate gripping force.

Figure 5:
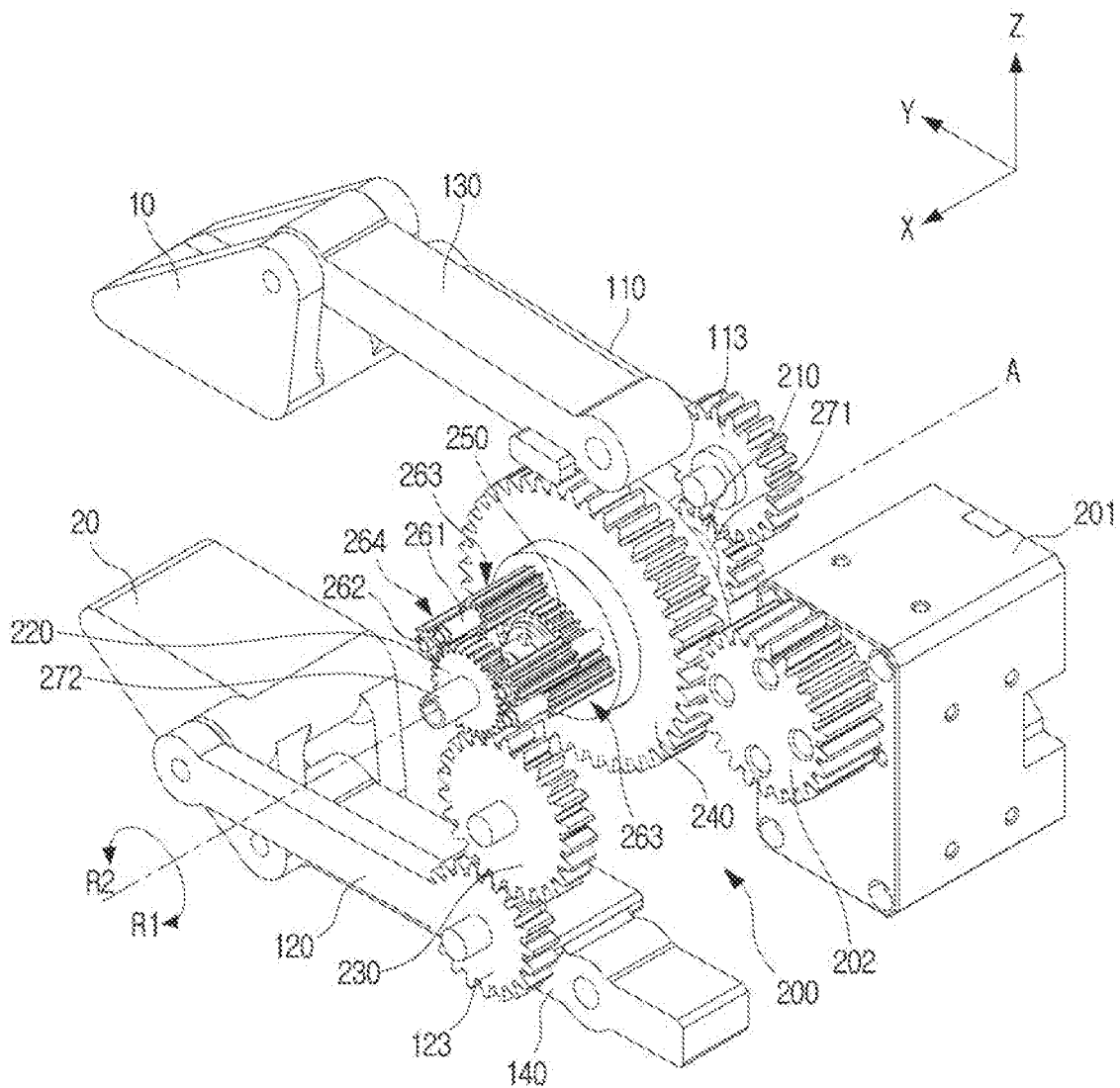
FIG. 5 is a perspective view of a grip apparatus in which first and second fingers are moved in opposite directions to be spaced apart from each other according to an embodiment.
Figure 6:
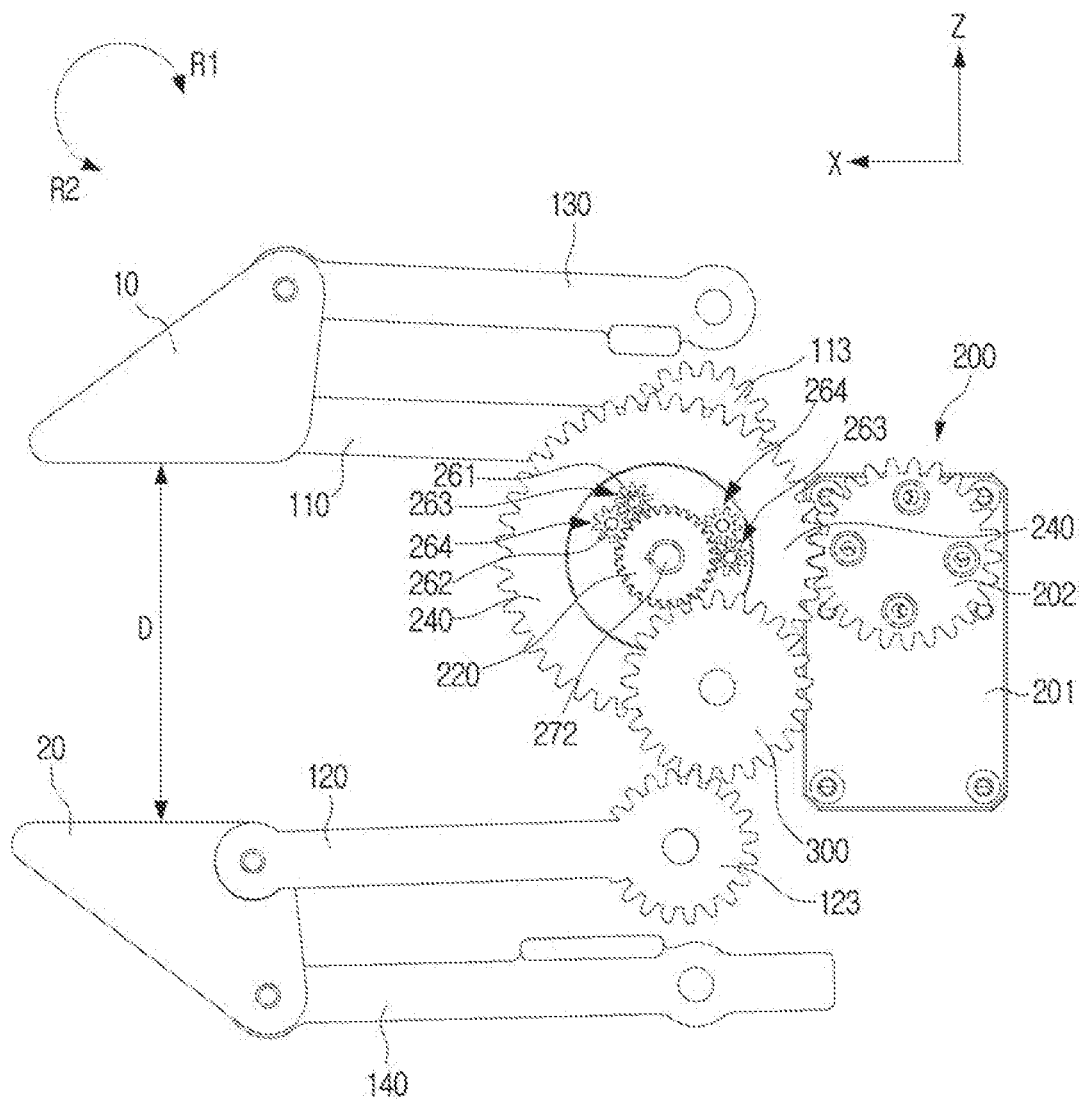
FIG. 6 is a side view of the grip apparatus of FIG. 5 according to an embodiment.

FIG. 5 is a perspective view of a grip apparatus in which first and second fingers are moved in opposite directions to be spaced apart from each other according to an embodiment. FIG. 6 is a side view of the grip apparatus of FIG. 5 according to an embodiment.

Referring to FIGS. 5 and 6, when the pinion 202 is rotated in an R2 direction by the motor 201, the ring gear 240 engaged with the pinion 202 and the plurality of spider shafts 261 and 262 formed integrally with the ring gear 240 may be rotated in an R1 direction.

The R1 direction and the R2 direction indicate the rotation directions on the Y-Z plane of each component, and may be opposite to each other.

The first and second spider gears 263 and 264 may rotate in the R1 direction with respect to the central axis A of the first and second shafts 271 and 272 together with the first and second spider shafts 261 and 262.

The side gear 250 engaged with the first spider gear 263 and the first shaft 271 and the first gear 210 formed integrally with the side gear 250 may be rotated in the R2 direction. In addition, the second gear 220 engaged with the second spider gear 264 may also be rotated in the R2 direction.

The gear region 113 of the first link 110 engaged with the first gear 210 may be rotated in the R1 direction. The third gear 230 engaged with the second gear 220 may be rotated in the R1 direction, and the gear region 123 of the second link 120 engaged with the third gear 230 may be rotated in the R2 direction.

That is, when the pinion 202 is rotated in the R2 direction, the first link 110 may be rotated in the R1 direction about the second end 112 thereof, and the second link 120 may be rotated in the R2 direction about the second end 122 thereof. Accordingly, the spacing D between the first and second fingers 10 and 20 may increase.

Conversely, when the pinion 202 is rotated in the R1 direction, the above-described process is reversed, such that the first link 110 may be rotated in the R2 direction about the second end 112 thereof, and the second link 120 may be rotated in the R1 direction about the second end 122 thereof. Accordingly, the spacing D between the first and second fingers 10 and 20 may decrease.

That is, because the spacing between the first and second fingers 10 and 20 increases or decreases by one motor 201 by the differential apparatus 200, it is possible to stably grip the object.

Meanwhile, because the gear region 113 of the first link 110 and the gear region 123 of the second link 120 have the same gear ratio, the first and second links 110 and 120 may be rotated at the same angle.

Figure 7:
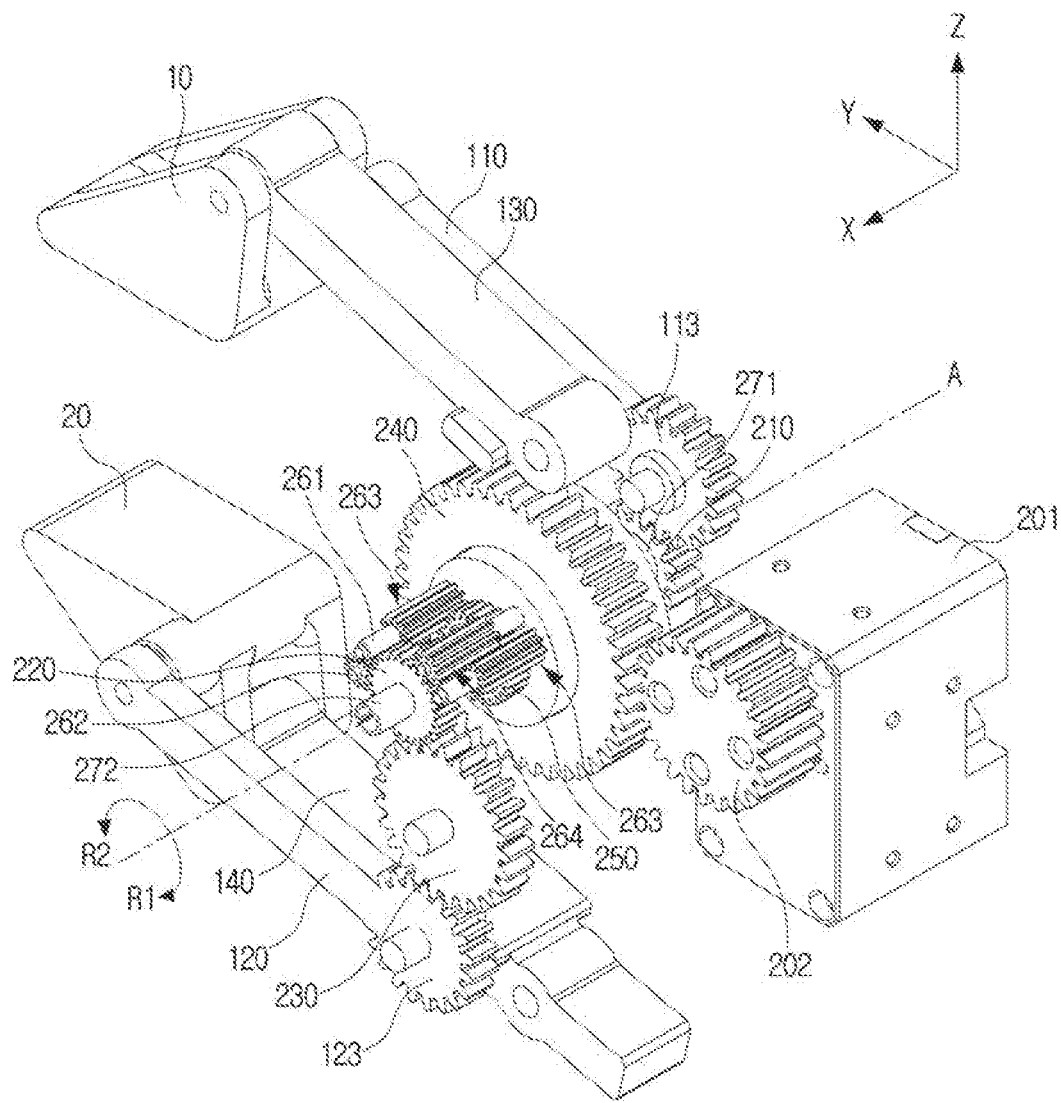
FIG. 7 is a perspective view of a grip apparatus in which the first and second fingers are moved in the same direction by an external force applied to the grip apparatus according to an embodiment.
Figure 8:
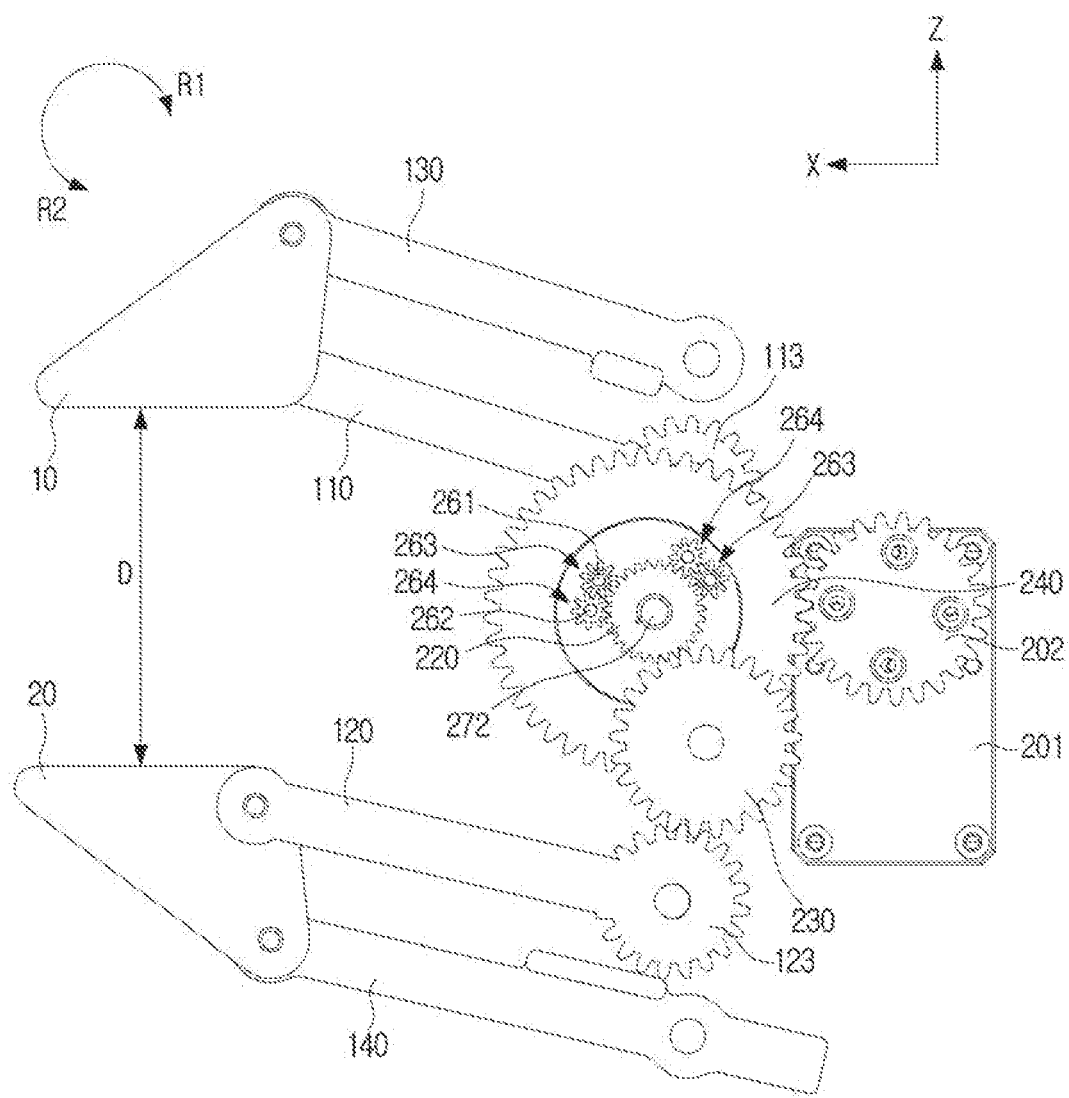
FIG. 8 is a side view of the grip apparatus of FIG. 7 according to an embodiment.

FIG. 7 is a perspective view of a grip apparatus in which the first and second fingers are moved in the same direction by an external force applied to the grip apparatus according to an embodiment. FIG. 8 is a side view of the grip apparatus of FIG. 7 according to an embodiment.

Referring to FIGS. 7 and 8, an external force in a +Z direction may be applied to at least one of the first and second fingers 10 and 20 and the first to fourth links 110, 120, 130, and 140.

For example, when the external force in the +Z direction is applied to the second link 120, the second link 120 may be rotated in the R1 direction around the first end 121 thereof. Accordingly, the gear region 123 of the second link 120 may also be rotated in the R1 direction.

The third gear 230 engaged with the gear region 123 of the second link 120 may be rotated in the R2 direction, and the second gear 220 engaged with the third gear 230 may be rotated in the R1 direction.

The second spider gear 264 engaged with the second gear 220 may rotate in the R2 direction about the second spider shaft 262, and the first spider gear 263 engaged with the second spider gear 264 may rotate in the R1 direction about the first spider shaft 261.

The side gear 250 engaged with the first spider gear 263 may be rotated in the R2 direction, and the first shaft 271 and the first gear 210 formed integrally with the side gear 250 may also be rotated in the R2 direction.

The gear region 113 of the first link 110 engaged with the first gear 210 may be rotated in the R1 direction, and thus the first link 110 may be rotated in the R1 direction about the first end 111 thereof.

When the second link 120 is rotated in the R1 direction by the external force, the first link 110 may also be rotated in the same R1 direction as the second link 120. That is, because the first and second links 110 and 120 are rotated in the same direction even when the external force is applied to the grip apparatus 1, the grip apparatus 1 may not drop the gripped object and maintain the gripping force.

The gear region 113 of the first link 110 and the gear region 123 of the second link 120 may have the same gear ratio, and accordingly, because the first and second links 110 and 120 are rotated at the same angle, the spacing D between the first and second fingers 10 and 20 is also maintained, so that the gripped object may not be dropped.

That is, the grip apparatus 1 according to an embodiment of the disclosure may have a passive adaptation mechanism capable of effectively absorbing an impact by flexibly responding to the external force without a separate sensing process or control process.

In addition, because the first and second links 110 and 120 are not fixed and are rotated in the same direction as the direction of the external force, a user who collides with the grip apparatus 1 may not be injured, or an obstacle that collides with the grip apparatus 1 may not be damaged.

In addition, even when the external force is applied to the grip apparatus 1, because the first and second spider gears 263 and 264 are only rotated, and the first and second spider shafts 261 and 262, the ring gear 240, and the pinion 202 are not rotated, damage to the motor 201 due to the external force may also be prevented.

Figure 9:
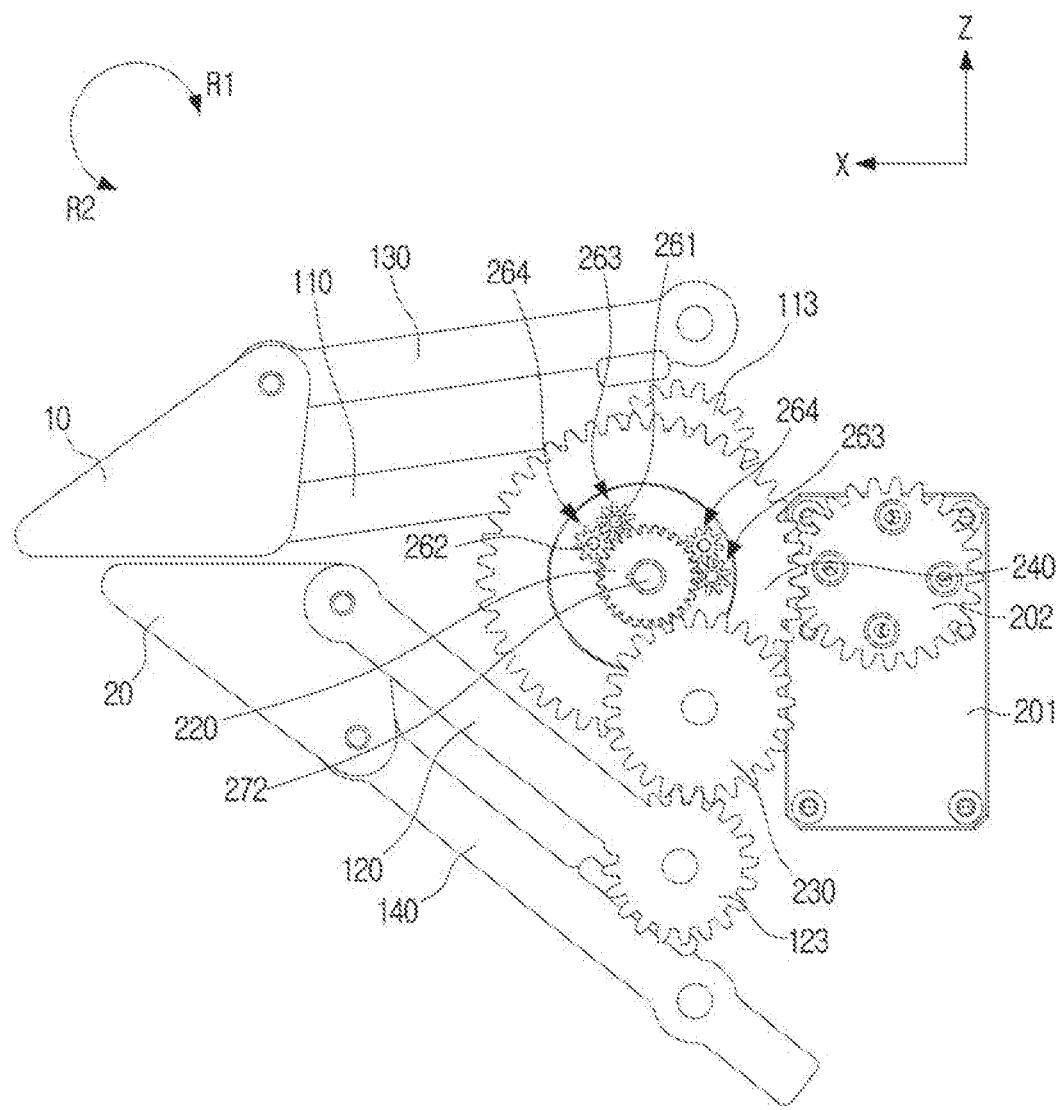
FIG. 9 is a side view illustrating a state in which the first and second fingers are moved in opposite directions in the grip apparatus of FIG. 7 according to an embodiment.

FIG. 9 is a side view illustrating a state in which the first and second fingers are moved in opposite directions in the grip apparatus of FIG. 7 according to an embodiment.

Referring to FIG. 9, when the pinion 202 is rotated in the R2 direction by the motor 201, the first link 110 may be rotated in the R2 direction about the second end 112 thereof, and the second link 120 may be rotated in the R2 direction about the second end 122 thereof according to the above-described process.

Accordingly, the first and second fingers 10 and 20 may grip the object at a position different from that of FIG. 2. That is, the grip apparatus 1 according to an embodiment of the disclosure may not necessarily grip only an object located in the middle, but may grip objects located at various positions along the Z-axis.

Figure 10:
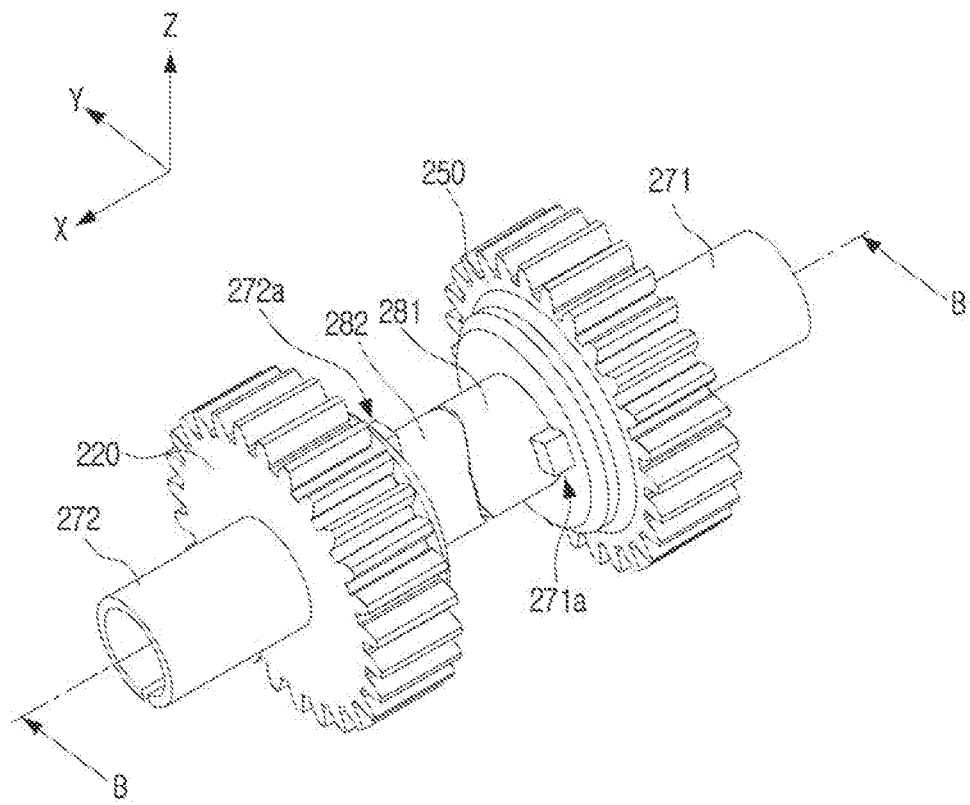
FIG. 10 is a perspective of first and second cam members according to an embodiment.
Figure 11:
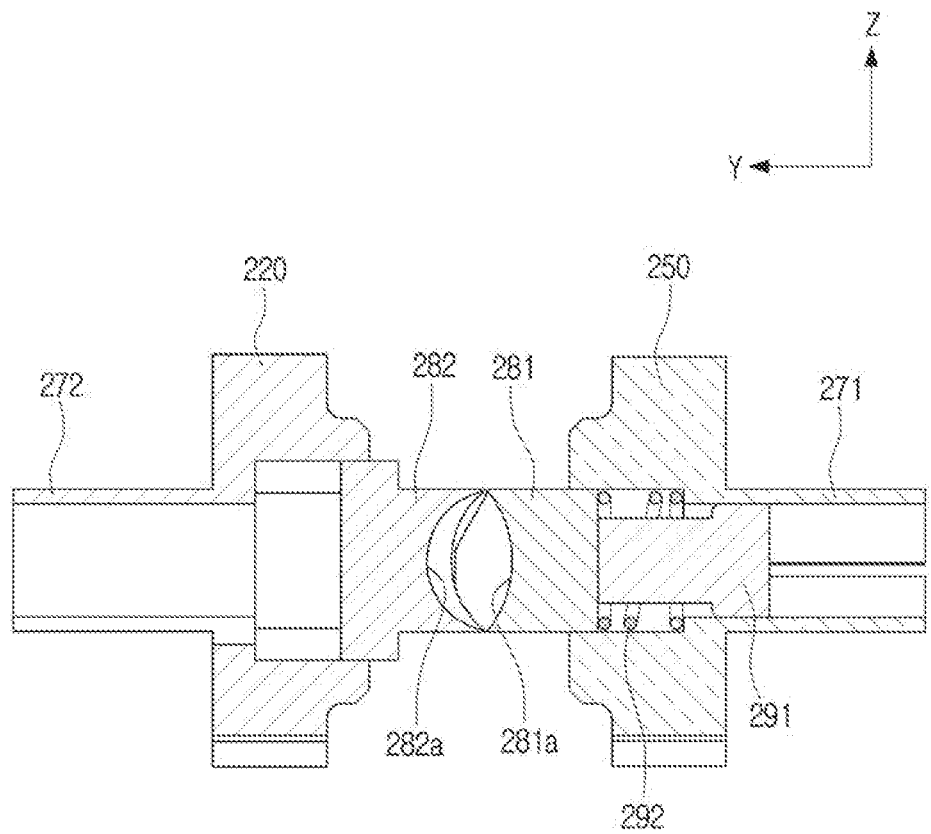
FIG. 11 is a cross-sectional view of first and second cam members according to an embodiment.
Figure 12:
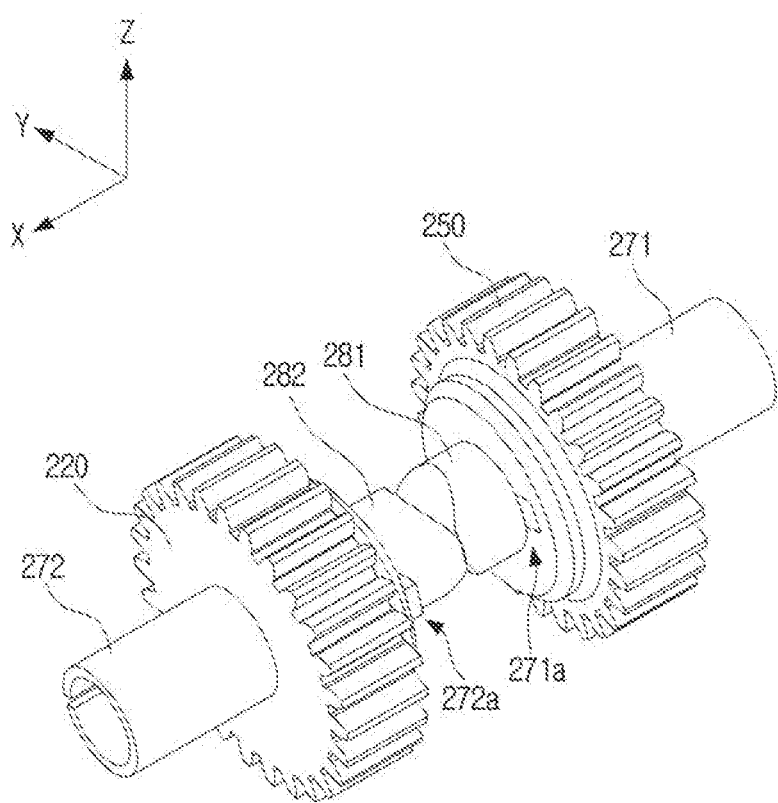
FIG. 12 is a perspective view illustrating a state in which one of the first and second cam members is twisted according to an embodiment.

FIG. 10 is a perspective view of first and second cam members according to an embodiment. FIG. 11 is a cross-sectional view of first and second cam members according to an embodiment. FIG. 12 is a perspective view illustrating a state in which one of the first and second cam members is twisted according to an embodiment.

Referring to FIGS. 10 to 12, the differential apparatus 200 may include a first cam member 281 and a second cam member 282.

The first cam member 281 may be connected in parallel to the first shaft 271, and the second cam member 282 may be connected in parallel to the second shaft 272 and in contact with the first cam member 281.

The first and second shafts 271 and 272 may have key grooves 271a and 272a formed on inner surfaces thereof, and the first and second cam members 281 and 282 may be respectively inserted along the key grooves 271a and 272a formed in the first and second shafts 271 and 272 to be connected to the first and second shafts 271 and 272.

Accordingly, the first and second cam members 281 and 282 may rotate integrally with the first and second shafts 271 and 272, and may relatively move only in the axial direction of the first and second shafts 271 and 272.

The first and second shafts 271 and 272 are spaced apart from each other, but the first and second cam members 281 and 282 connected thereto may be in contact with each other.

The first and second cam members 281 and 282 may be disposed along an X axis. The first and second cam members 281 and 282 may have concave surfaces 281a and 282a facing each other. The surfaces 281a and 282a of the first and second cam members 281 and 282 may have a shape in which an intermediate region thereof is concave, and a portion of a peripheral region thereof protrudes to engage with each other.

In addition, the differential apparatus 200 may further include a bolt 291 and a pressing member 292. The bolt 291 may be fixedly disposed inside at least one of the first and second shafts 271 and 272, and the pressing member 292 may connect the bolt 291 to at least one of the first and second cam members 281 and 282. The pressing member 292 may be a compression spring that pushes the first cam member 281 or the second cam member 282 from the bolt 291.

In FIGS. 10 to 12, the bolt 291 and the pressing member 292 are illustrated as being disposed inside the first shaft 271, but the positions thereof are not limited thereto.

When an external force of a threshold value or less is applied to the grip apparatus 1, the first and second shafts 271 and 272 may not be rotated due to a frictional force acting between the first and second cam members 281 and 282 by the pressing member 292. Accordingly, it is possible to prevent the first and second fingers 10 and 20 being unintentionally moved by a small force such as gravity of the grip apparatus 1 itself.

When an external force of the threshold value or more is applied to the grip apparatus 1, the pressing member 292 is retracted, and the first cam member 281 or the second cam member 282 enters the first shaft 271 or the second shaft 272, respectively. As a result, the first and second cam members 281 and 282 may be twisted and rotated to be spaced apart from each other. Accordingly, in order to prevent the grip apparatus 1 from being unintentionally operated, the external force may be selected by the first and second cam members 281 and 282 and the pressing member 292 which are in contact with each other, and the passive adaptation process described above with reference to FIGS. 7 and 8 may be performed only for the external force of the threshold value or more.

In the above, the embodiment of the disclosure has been shown and described, but the disclosure is not limited to the specific embodiment described above, and anyone with ordinary skill in the art to which the disclosure pertains can make various modifications without departing from the gist of the disclosure as claimed in the claims, and such modifications are intended to be within the scope of the claims.

What is claimed is:

1. A grip apparatus comprising:
   a first finger;
   a second finger configured to face the first finger;
   a first link configured to have a first end connected to the first finger;
   a second link configured to have a first end connected to the second finger; and
   a differential apparatus configured to connect a second end of the first link and a second end of the second link, the differential apparatus comprising:
      a motor;
      a first shaft;
      a side gear connected to the first shaft;
      a second gear coaxial with the side gear;
      a first spider shaft and a second spider shaft in parallel with the first shaft, the first spider shaft and the second spider shaft spanning the second gear and the side gear;
      a first spider gear engaged with the side gear and rotatably supported on the first spider shaft; and
      a second spider gear engaged with the first spider gear and the second gear, the second spider gear being rotatably supported on the second spider shaft,
   wherein the differential apparatus rotates the first link and the second link in different directions when the motor is driven, and
   wherein the differential apparatus rotates the first link in a first direction when the second link rotates in the first direction by an external force.

2. The grip apparatus of claim 1,
wherein the first link includes a first gear region at the second end thereof and the second link includes a second gear region at the second end thereof,
wherein the differential apparatus further comprises:
a first gear configured to be engaged with the first gear region, and
a third gear configured to be engaged with the second gear region and the second gear, and
wherein the second gear is configured to be interlocked with the first gear and rotate with respect to the first gear.

3. The grip apparatus of claim 2, wherein the differential apparatus further comprises a ring gear configured to be disposed between the first gear and the second gear, and configured to be rotated by the motor.

4. The grip apparatus of claim 2, wherein the first gear region and the second gear region have the same gear ratio.

5. The grip apparatus of claim 2,
wherein the differential apparatus further comprises a second shaft configured to have a first end connected to the second gear and rotate integrally with the second gear,
wherein the first shaft is configured to have a first end connected to the first gear and rotate integrally with the first gear, and
wherein the first shaft and the second shaft are coaxially disposed.

6. The grip apparatus of claim 2,
wherein the differential apparatus further comprises a ring gear configured to be disposed between the first gear and the second gear and configured to be rotated by the motor,
wherein the side gear is configured to be connected to a second end of the first shaft and configured to be rotated integrally with the first shaft, and
wherein the first spider shaft and the second spider shaft are configured to be rotated integrally with the ring gear.

7. The grip apparatus of claim 5, wherein the first gear region and the third gear are disposed on opposite sides with respect to a central axis of the first shaft and the second shaft.

8. The grip apparatus of claim 2,
wherein the differential apparatus further comprises a ring gear configured to be disposed between the first gear and the second gear and configured to be rotated by the motor, and
wherein the first shaft penetrates the ring gear.

9. The grip apparatus of claim 5, wherein the differential apparatus further comprises:
a first cam member configured to be connected in parallel to the first shaft, and
a second cam member configured to be connected in parallel to the second shaft and in contact with the first cam member.

10. The grip apparatus of claim 9, wherein the differential apparatus further comprises:
a bolt configured to be fixedly disposed inside at least one of the first shaft and the second shaft, and
a pressing member configured to connect at least one of the first cam member and the second cam member with the bolt.

11. The grip apparatus of claim 10, wherein the pressing member comprises a compression spring.

12. The grip apparatus of claim 9,
wherein the first shaft and the second shaft include key grooves formed on inner surfaces thereof, and
wherein the first cam member and the second cam member are respectively inserted along the key grooves formed in the first shaft and the second shaft.

13. The grip apparatus of claim 9, wherein the first cam member and the second cam member include concave surfaces facing each other.

14. The grip apparatus of claim 1, further comprising a housing configured to rotatably support the first end of each of the first link and the second link.

15. A robot apparatus comprising:
an image sensor configured to detect of a shape of an object;
a grip apparatus comprising:
a first finger;
a second finger, finger;
a first link configured to have a first end connected to the first finger;
a second link configured to have a first end connected to the second finger; and
a differential apparatus configured to connect a second end of the first link and a second end of the second link, the differential apparatus comprising:
a motor;
a first shaft;
a side gear connected to the first shaft;
a second gear coaxial with the side gear;
a first spider shaft and a second spider shaft in parallel with the first shaft, the first spider shaft and the second spider shaft spanning the second gear and the side gear;
a first spider gear engaged with the side gear and rotatably supported on the first spider shaft; and
a second spider gear engaged with the first spider gear and the second gear, the second spider gear being rotatably supported on the second spider shaft; and
a processor configured to control the grip apparatus such that the first finger and the second finger are spaced apart by a distance corresponding to a thickness of the object detected by the image sensor.

* * * * *